Oct. 8, 1957   A. F. ERKE   2,809,065
LOCK SEAL SUITABLE FOR MANUFACTURE IN PLASTICS
Filed July 27, 1956
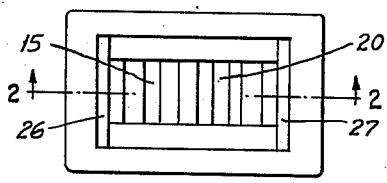
Fig.1
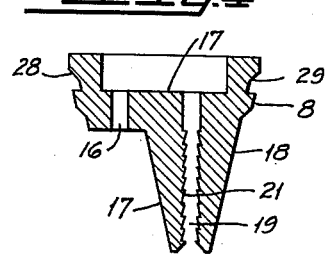
Fig.4
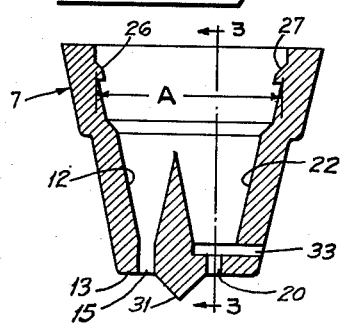
Fig.2
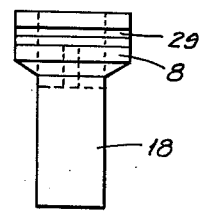
Fig.5
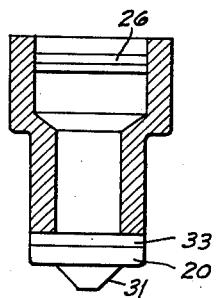
Fig.3
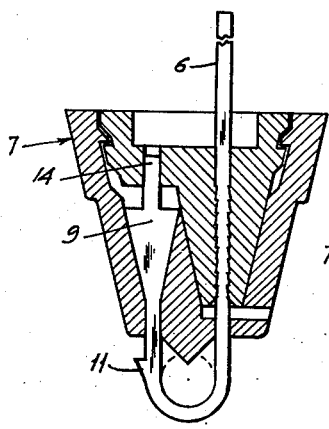
Fig.7
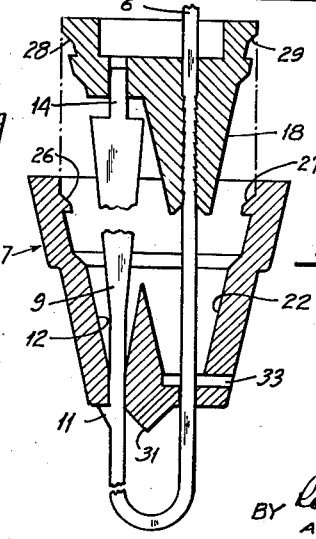
Fig.6
Fig.8
INVENTOR.
August F. Erke
ECKHOFF & SLICK
ATTORNEYS
BY
A MEMBER OF THE FIRM United States Patent Office 2,809,065
Patented Oct. 8, 1957

2,809,065

LOCK SEAL SUITABLE FOR MANUFACTURE IN PLASTICS

August F. Erke, Mill Valley, Calif., assignor to John F. Rhodes, San Francisco, Calif.

Application July 27, 1956, Serial No. 600,518

5 Claims. (Cl. 292—307)

This invention relates to seals, particularly those which are used to provide a seal about the end of a cloth bag or the like.

It is in general the broad object of the present invention to provide a novel bag seal device which can be manufactured of relatively inexpensive plastic materials.

A further object of the present invention is to provide an improved bag seal which is constructed of a minimum number of parts and which is quite simple to manipulate.

The invention includes other objects and features of advantage, some of which, together with the foregoing, will appear hereinafter wherein the present preferred form of bag seal is disclosed. In the drawings accompanying and forming a part hereof, Figure 1 is an end view of one of the elements of the seal.

Figure 2 is a section taken along the line 2—2 of Figure 1.

Figure 3 is a section taken along the line 3—3 in Figure 2.

Figure 4 is an end elevation of another portion of the seal.

Figure 5 is a section taken along the line 5—5 in Figure 4.

Figure 6 is a side elevation of the seal portion shown in Figures 4 and 5.

Figures 7 and 8 are, respectively, sections taken through the device, the device being shown in assembled position in Figure 7 while, in Figure 8, the device is shown during assembly.

Referring to the drawings, the invention comprises three components; a strip 6, a first seal member 7, and a second seal member 8. The strip is made of a flat piece of molded plastic material such as nylon, and preferably includes a plug 9, formed adjacent one end of the strip; the strip can have a series of transverse serrations (not shown). One end 14 of the strip 6 is secured in a hole 16 in the second seal member, while a shoulder 11 is formed on the strip intermediate the ends of the strip. The shoulder 11 engages the end 13 of the first seal member adjacent slot 15 to limit the movement between the two seal members, as is shown somewhat schematically in Figure 8 wherein the two seal members are shown in juxtaposition but spaced apart for convenience in illustration.

The second seal member also includes a pair of spaced arms 17 and 18, which extend forwardly to define a slot 19. The interior faces of the arms 17 and 18 defining slot 19 are provided with saw tooth edges 21, the slot 19 being of such width as to pass the strip 6 freely when this is inserted through slot 20 in the first seal member and thence between the arms when the second seal member is out of locking engagement with the first seal member, as is shown in Figure 8.

As appears in Figures 5, 7, and 8, the arms 17 and 18 are tapered toward each other, being adapted to fit in a complementary tapered cavity 22 provided in the first seal member. Locking means are provided about the upper end of each of the first and second seal members, taking the form of opposite tapered shoulders 26 and 27 provided upon opposite end walls of the first seal member, while the second seal member is suitably recessed as at 28 and 29 in each of its end walls, to receive the shoulders 26 and 27. The overall width of the second seal member corresponds to the distance A, indicated on the first seal member in Figure 3. Thus, it will be apparent that it is necessary to force the second seal member into place by springing the first seal member. The effect of this is to force arms 17 and 18 into the tapered cavity 22 whereby the arms are moved toward each other to compress that portion of strip 6 which extends through slot 19.

In use, with the first and second seal members in axial alignment and with the strip 6 extending through the slots 19 and 20 and thence beyond the second seal member, the strip is drawn taut about the end of the bag and the entire seal lock is brought up in snug engagement with the bag, the projection 31 on the first seal member forcing its way into the bag to permit of a very tight engagement with the neck of the bag. In this position, the second seal member is forced into the first seal member with the result that the shoulders 26 and 27 interlock with the recesses 28 and 29 in the second seal member, in which position the seal members will be retained until the tension of the strip is relieved, as by severing the strip. To facilitate this and avoid cutting the bag, a third slot 33 is provided in the first seal member transversely to the strip 6 to permit insertion of a knife blade so that the strip can be cut in that region which is between the ends of the arms 17 and 18 and the end wall in the first member providing the slot 20.

From the foregoing, I believe it will be apparent that I have provided a novel, simple and improved bag lock which can be manufactured inexpensively of various plastic materials. The serrated strip 6 engages the bag securely and, additionally, is held firmly by arms 17 and 18.

I claim:

1. A lock seal comprising a strip, a first seal member, a second seal member, a plug secured adjacent one end of the strip and adapted to fit in locking engagement in a cavity in the first seal member with a portion of the strip on one side of the plug fitting in a recess in the second seal member and with that portion of the strip on the other side of the plug extending through a first slot in the first seal member, a second slot in the first seal member adapted to pass the other end of the strip, said second seal member having a pair of parallel arms extending therefrom and spaced to receive the other end of the strip in close engagement for passage therebetween and through a slot provided in the second seal member, the outer face of each arm tapering toward the end of the other arm, the first seal member having a tapered cavity therein adapted to receive the tapered arms on the second seal member and to move said arms into tight retaining engagement with that portion of the strip extended between the arms, the upper portion of the first seal member having tapered side wall portions extending inwardly, the upper portion of the second seal member having tapered side wall portions complementary to those on the first seal member and adapted to interlock therewith to retain said second seal member in said first seal member with said arms compressed on said strip.

2. A lock seal comprising a strip, a first seal member, a second seal member, means securing one end of the strip in the first seal member with a portion of the strip extending through a first slot in the first seal member, a second slot in the first seal member adapted to pass the other end of the strip, said second seal member having a pair of parallel arms extending therefrom and spaced to receive the other end of the strip in close engagement for passage therebetween and through a slot provided in the second seal member, the outer face of each arm tapering toward the end of the other arm, the first seal member having a tapered cavity therein adapted to receive the tapered arms on the second seal member and to move said arms into tight retaining engagement with that portion of the strip extended between the arms, and means for locking the second seal member in the first seal member with said arms compressed on said strip.

3. A lock seal comprising a strip, a first seal member, a second seal member, means securing one end of the strip in the first seal member with a portion of the strip extending through a first slot in the first seal member, a second slot in the first seal member adapted to pass the other end of the strip, said second seal member having a pair of parallel arms extending therefrom and spaced to receive the other end of the strip in close engagement for passage therebetween and through a slot provided in the second seal member, the outer face of each arm tapering toward the end of the other arm, the first seal member having a tapered cavity therein adapted to receive the tapered arms of the second seal member and to move said arms into tight retaining engagement with that portion of the strip extended between the arms, the upper portion of the first seal member being adapted to interlock with said arms compressed on said strip.

4. A lock seal comprising a strip, a first seal member, a second seal member, a plug secured adjacent one end of the strip and adapted to fit in locking engagement in a cavity in the first seal member with a portion of the strip on one side of the plug fitting in a recess in the second seal member and with that portion of the strip on the other side of the plug extending through a first slot in the first seal member, a second slot in the first seal member adapted to pass the other end of the strip, a third slot in the first seal member extending normal to the second slot to permit cutting of said strip, said second seal member having a pair of parallel arms extending therefrom and spaced to receive the other end of the strip in close engagement for passage therebetween and through a slot provided in the second seal member, the outer face of each arm tapering toward the end of the other arm, the first seal member having a tapered cavity therein adapted to receive the tapered arms on the second seal members and to move said arms into tight retaining engagement with that portion of the strip extended between the arms, the upper portion of the first seal member having tapered side wall portions extending inwardly, the upper portion of the second seal member having tapered side wall portions complementary to those on the first seal member and adapted to interlock therewith to retain said second seal member in said first seal member with said arms compressed on said strip.

5. A lock seal comprising a strip of flexible plastic material, a first seal member and a second seal member, means securing the strip to one of the seal members from which the strip extends to provide a loop for passage about the neck of a bag, the other end of the strip being threaded through the first seal member and thence through a pair of compressible jaws provided in the second seal member, the first seal member having a cavity therein to receive the second seal member, and locking means provided between the seal members to secure the second seal member in a locked position in the first seal member with the jaws on the second seal member compressed upon the strip passed between said jaws.

References Cited in the file of this patent

UNITED STATES PATENTS

| | | |
|---|---|---|
| 77,953 | Bickerstaff | May 19, 1868 |
| 312,963 | Brooks | Feb. 24, 1885 |
| 601,770 | Dockstader | Apr. 5, 1898 |
| 1,964,014 | Wenk | June 26, 1934 |
| 1,977,301 | Bradford | Oct. 16, 1934 |